United States Patent
Lang et al.

(10) Patent No.: US 6,295,492 B1
(45) Date of Patent: Sep. 25, 2001

(54) SYSTEM FOR TRANSMITTING AND DISPLAYING MULTIPLE, MOTOR VEHICLE INFORMATION

(75) Inventors: Brook W. Lang; Mark H. Tyerman, both of Kirkland, WA (US)

(73) Assignee: InfoMove.com, Inc., Kirkland, WA (US)

(*) Notice: Subject to any disclaimer, the term of this patent is extended or adjusted under 35 U.S.C. 154(b) by 0 days.

(21) Appl. No.: 09/492,264

(22) Filed: Jan. 27, 2000

Related U.S. Application Data

(60) Provisional application No. 60/117,487, filed on Jan. 27, 1999.

(51) Int. Cl.[7] ............................. G01M 15/00; G01R 31/00
(52) U.S. Cl. ................................ 701/33; 701/24; 701/35; 701/36; 340/425.5; 340/438
(58) Field of Search ................................ 701/33, 36, 200, 701/213, 24, 35, 1; 340/438, 425.5, 459, 286.02, 286.01

(56) References Cited

U.S. PATENT DOCUMENTS

| | | | |
|---|---|---|---|
| 4,926,330 | | 5/1990 | Abe et al. ........................ 364/424.03 |
| 5,050,080 | * | 9/1991 | Abe ..................................... 701/35 |
| 5,289,378 | * | 2/1994 | Miller et al. ........................ 701/35 |
| 5,473,540 | * | 12/1995 | Schmitz ............................. 701/1 |
| 5,680,328 | | 10/1997 | Skorupski et al. .................. 364/550 |
| 5,758,300 | * | 5/1998 | Abe ..................................... 455/456 |
| 5,850,209 | | 12/1998 | Lemke et al. ...................... 345/156 |
| 5,884,202 | | 3/1999 | Arjomand ........................... 701/29 |
| 5,928,292 | * | 7/1999 | Miller et al. ........................ 701/1 |
| 6,104,988 | * | 8/2000 | Klarer ................................ 702/183 |
| 6,141,611 | * | 10/2000 | Mackey et al. .................... 701/35 |

* cited by examiner

Primary Examiner—William A. Cuchlinski, Jr.
Assistant Examiner—Olga Hernandez
(74) Attorney, Agent, or Firm—Dean A. Craine

(57) ABSTRACT

A system for transmitting, collecting and displaying diagnostic and operational information from one or more motor vehicles to a central server connected to a wide area network. The system is designed to be used with an existing on-board diagnostic system found in most motor vehicles manufactured today. The system includes a translator device capable of translating the codes from an on-board diagnostic connector into computer readable files such as ASCII files. The translator device may be connected to an on-board computer that includes a wireless modem capable of connecting to a wireless communication network and eventually to a wide area network. A central server is connected to the wide area network which receives and stores information from the on-board computer. Authorized users may connect to central server via the wide area network and request information therefrom regarding selected motor vehicles. All of the information may be presented in a single interface.

15 Claims, 2 Drawing Sheets

SYSTEM FOR TRANSMITTING AND DISPLAYING MULTIPLE, MOTOR VEHICLE INFORMATION

This is a utility patent application based on the provisional patent application filed on Jan. 27, 1999 (60/117,487).

BACKGROUND OF THE INVENTION

1. Field of the Invention

A method of presenting multiple, mobile wireless communications network service information.

2. Description of the Related Art

On-board computers coupled to a wireless communications network service are now available that enable manufacturers of motor vehicles to obtain useful information regarding the motor vehicle. Typically, these on-board computers are electrically connected to sensors located in various systems in the motor vehicle that instantaneously report the status or condition of the system. Manufacturers of motor vehicles can connect to the on-board computer via the mobile, wireless communication network to obtain information from the motor vehicle anywhere within the region covered by the wireless communication network.

Recently, it has been reported that on-board computers can now be used by motor vehicle operators to download and upload information from a central server connected to a wide area network such as the World Wide Web via the mobile, wireless communications network. Using the on-board computer, an operator can now obtain e-mail messages or other important information from any other servers connected to the wide area network.

Many motor vehicle drivers own motor vehicles manufactured by different manufacturers. Unfortunately, no standard computer program has been developed which can interact with all on-board computers used in every motor vehicle. This creates a large burden for the operator of multiple motor vehicles to understand and learn to operate every computer and program.

On-board diagnostic systems are used today in most cars and light trucks. To meet federal EPA emission standards implemented in the 1970's, motor vehicle manufacturers started using electronic devices to control engine functions such as fuel feed, ignition, and to diagnose engine problems.

Initially, motor vehicle manufacturers had their own systems which were not compatible. In 1988, the Society of Automotive Engineers (SAE) set standards which included a standard connector plug and a set of diagnostic test signals that dealer's used when adjusting or repairing the motor vehicle. Although motor vehicle manufacturers may have used a uniform set of test signals, the meaning of these test signals is proprietary. The standard connector plug and set of test signals, today, is known collectively as OBD-II which applies to all cars and light trucks built after Jan. 1, 1996. It is anticipated that new on-board diagnostic connectors (i.e. OBD-III) will be developed in the future.

Translator devices, also known as diagnostic scanners, are available that connect to the OBD-II connector plug and translate the diagnostic test signals into ASCII files capable of being used by a personal computer. One translator device, known as AUTOTAP, is available from B&B Electronics Manufacturing Company, of Ottawa, Ill. Using this device, independent mechanics are able to connect to the OBD-II connector plug and obtain factory diagnostic service code information.

What is needed is a system for operators of motor vehicles to easily obtain motor vehicle diagnostic and operating information and store this information in a location for later retrieval.

What is also needed is such a system that enables operators to obtain information remotely for a plurality of motor vehicles and then present this information in a concise manner on a single interface.

SUMMARY OF THE INVENTION

It is an object of the present invention to provide a system for collecting and transmitting diagnostic and operation motor vehicle information to a central computer for real time or later retrieval.

It is another object of the present invention to provide such a system that collects and transmits motor vehicle information from a plurality of motor vehicles in remote locations and collects the information on a central server.

It is a further object of the present invention to provide such a system that enables the information to be presented in a single interface.

These objects and other objects are met by a system designed to be used with motor vehicles that use sensors and an on-board diagnostic system, such as OBD-II, that enables users to review real time and historical diagnostic and performance information data for one motor vehicle or a plurality of motor vehicles. The system includes the use of a translating means that connects to the motor vehicle's on-board diagnostic system. In one embodiment, the translating means is a separate translator device designed specifically to connect to a commonly used OBD-II connector plug. The translator device includes a translator program capable of translating the proprietary diagnostic test signals into diagnostic service codes presented in a standard computer language, such as ASCII files, to be used by an electronic device, hereinafter called an on-board computer.

The on-board computer is connected to a wireless communication means that continuously or intermittently transmits the ASCII files to a central network server connected to a wide area network, such as the INTERNET. The central network server collects the ASCII text files in a user database file. Authorized users, such as the owner of the motor vehicle or representatives of the motor vehicle manufacturer may connect to the central network server and receive real time data or historical information from the user's database file.

An important aspect of the system is that information from multiple motor vehicles may be collected and transmitted to the central server for retrieval by authorized users. A second important aspect is that the system may be used with all motor vehicles that use EPA-mandated diagnostic codes, translating manufacturer's proprietary diagnostic service codes, and provides real time performance data. A third important aspect is that operators can obtain this information anywhere they have access to the wide area network and have it presented in a single interface.

DESCRIPTION OF THE PREFERRED EMBODIMENT(S)

Figure 2:
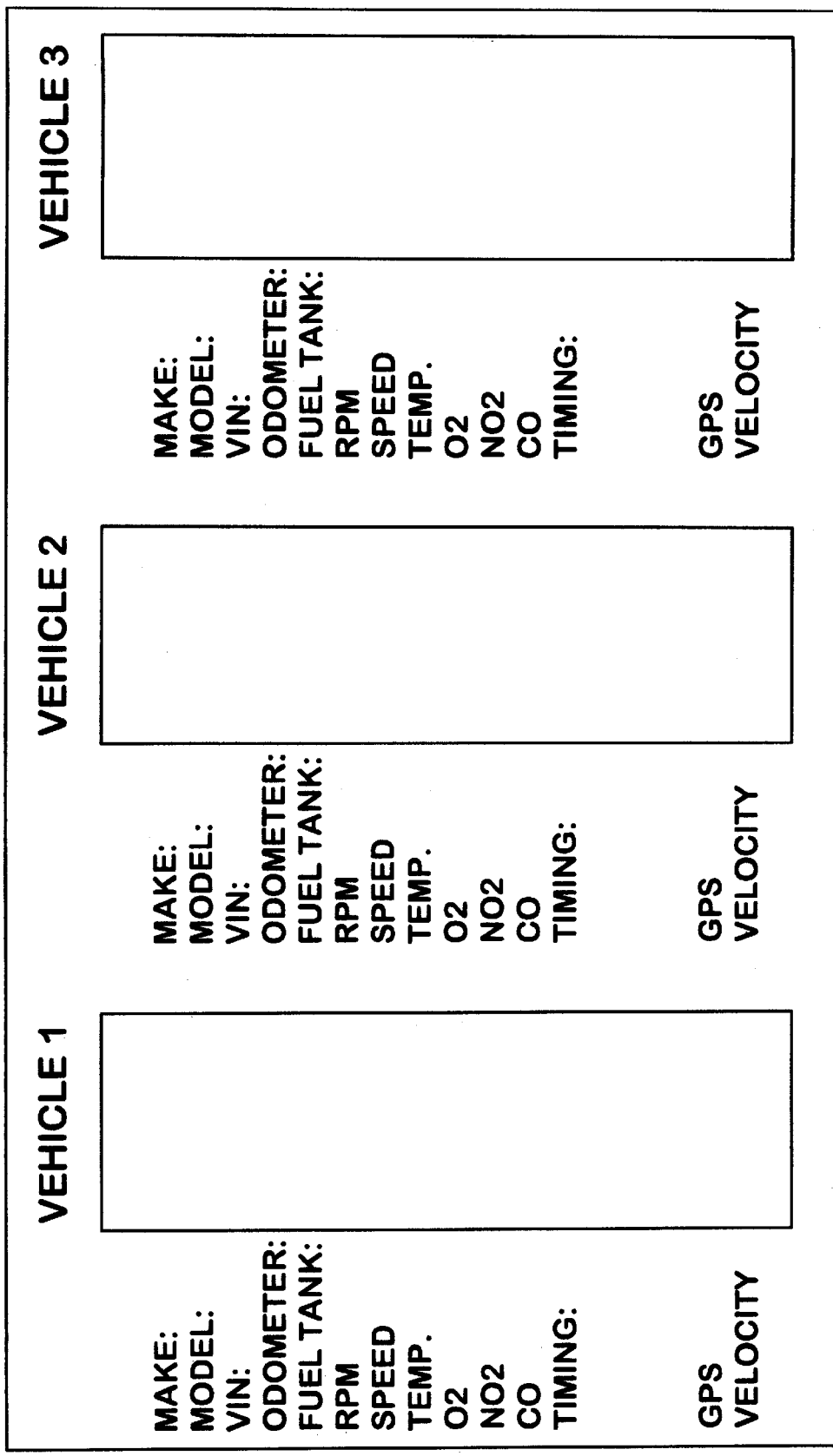
FIG. 2 is a front plan view of a monitor presenting information collected for a plurality of motor vehicles.

Disclosed herein is a system 10 of transmitting and displaying real time and historical multiple motor vehicle information over a central server 60 connected to a wide area network 45. Authorized users may then connect to the central server 60 to connect the real time or historical information on selected motor vehicles. The system 10 is especially beneficial to operators of multiple motor vehicles, each having factory-installed sensors or a computer module which enables the operators to conveniently connect to the wide area network 45 and receive the stored uploaded information for each motor vehicle. The information for all of the motor vehicles controlled by the operation may be conveniently present on one monitor interface as shown in FIG. 2.

The system 10 uses a translator device 14, also known as diagnostic scanners, capable of connected to an existing OBD-II connector plug 8 and translate the diagnostic test signals into ASCII files capable of being used by a personal computer. One translator device 14, known as AUTOTAP, is available from B&B Electronics Manufacturing Company, of Ottawa, Ill. Each motor vehicle that uses the system 10 must have a translator device 14 that connects to the OBD-II plug connector 8.

The translator device 14 includes an output cable 6 and plug 7 that connects to an RS 232 (COM) port 22 on the on-board computer 20. The translator device 14 includes a microprocessor and custom circuitry (not shown) that translate the signals from the motor vehicle's sensors 3–5 or computer module 7 to ASCII text file capable of being used by the on-board computer 20.

The on-board computer 20 may be a hand-held device, a lap-top computer, or a PDA. Each on-board computer 20 is coupled to a wireless communication means, such as a wireless modem 35, which transmits the diagnostic and performance information and other useful information over a wireless communication network 40 to the central server 60 connected to a wide area network 45. The central server 60 collects the uploaded information from an on-board computer 20 located in one motor vehicle or in a plurality of motor vehicles located in the region.

The on-board computer 20 may also be coupled to an optional physical location detection means capable of instantaneously determining the physical location, heading, and elevation of the on-board computer 20, and hence, the motor vehicle. In the preferred embodiment, the physical location detecting means is a global positioning system (GPS) receiver 30. The GPS receiver 30 is able to immediately establish the monitoring electronic device's global position, (i.e. latitude, longitude, elevation), heading, and velocity.

The GPS is a location system based on a constellation of twenty-four satellites orbiting the Earth at altitudes of approximately 11,000 miles. The GPS satellites provide accurate positioning information twenty-four hours per day, anywhere in the world. The GPS uses as receiver that stores orbit information for all GPS satellites. During use, the receiver determines the time and the positions of the overhead satellites and then calculates the amount of time it takes a GPS radio signal to travel from the satellites to the receiver. By measuring the amount of time it takes for a radio signal to travel from the satellites, the exact location of the GPS receiver can be determined. GPS receivers 30 are available from Corvallis Microtechnology, Inc., in Corvallis, Oreg. It should be understood however, that other means for automatically determining the user's physical location could be used.

In the preferred embodiment, the system 10 uses GPS receivers 30 that are 3-D coordinate receivers that require a minimum of four visible satellites. It should be understood, however, that the system 10 could be used with 2-D coordinate receivers, which require a minimum of three satellites. The 3-D coordinate receivers are preferred, since they will continue to provide 2-D coordinate information when their views are obstructed by trees, mountains, buildings, etc.

A critical component of the system is the client-side software program 28 loaded on each on-board computer 20. The software program 28 collects the information from the translator device 14 and the GPS receiver 30 and transmits it via the wireless modem 35 to the wireless communication network 40. The client-side software program 28 must be able to communicate with the server software program 54 located in the central computer 60. When the user initially logs into the system 10, the client-side software program 28 also transmits the user identification information such as the user's name and password.

Another important function of the client-side software program 28 is to display a standard interface which displays the translated information to the operator. The interface can then be used to review all of the data stored in the central server 60 thereby providing a complete review of all of the sensors 3–5 used in the motor vehicles under the operator's control. The client-side software program 28 can also be loaded into remote computers to enable the operator to obtain information regarding the motor vehicles.

As discussed above, the central server 60 is connected to the wide area network 45 and is able to communicate with a plurality of on-board computers 20 also connected to the wide area network 45. It should be understood that the central server 60 may be one server or a group of servers all connected to the wide area network 45. Loaded into the memory of the central computer 60 or in the memory of each server is the server-side software program 54 capable of uploading and processing data from the client side software program 28 used with each on-board computer 20 and remote computer 27 as shown in FIG. 2. During use, the central server 60 creates a user information database 63 containing all of the user ID information collected motor vehicle information.

In order to download information from the central server 60, the user must submit a request using the client-side software program 28. In order to use the system 10, the user's or on-board computer's network address must be known to the central server 60 so that information may be downloaded thereto. If the central server 60 is also the authorized user's network service provider to the wide area network 45 and a previously established account has been set up on the central server 60, the numerical or temporary address would be known to the central computer 60 when the user signs onto the central server 60. If the user does not have a previously established account on the central server 60, then the client side software program 28 must be used to collect and transfer the account information to the central server 60 each time the user logs onto the central computer 60.

During use, the user's personal information is entered into the client side software program 28. When initial contact.is made with the central server 60, the personal information is automatically downloaded to the central server 60. The client side software program 28 may be a proprietary software program, or may be included as an add-on to an existing INTERNET browser software program. After the account information has been confirmed or set up on the central server 60, the users may begin to download and/or upload information from the central server 60.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

We claim:

1. A system for transmitting and displaying diagnostic and performance information for a motor vehicle having an on-board diagnostic system, said diagnostic system including a plurality of sensors capable of transmitting codes indicating the status of components on said motor vehicle, said system comprising:
   a. a translating means used to translate said codes from said sensors to a computer readable file;
   b. a wireless communication means coupled to said translating means used to communicate with a wireless communication network located in a specific region;
   c. a wireless communication network located around said specific region;
   d. a computer wide area network; and,
   e. a central computer connected to said wide area network, said central computer used to receive said translate information from a plurality of said translating means located in different motor vehicles and connected to said wide area network by said wireless communication means in said specific region.

2. The system as recited in claim 1, further including an on-board computer connected to said translating means and said wireless communication means.

3. The system for transmitting and displaying diagnostic and performance information for a motor vehicle having an on-board diagnostic system, said system including a plurality of sensors that produce transmitting codes to indicate the status of specific components in said motor vehicle, said system comprising:
   a. a translator device connected to said on-board diagnostic system in said motor vehicle, said translator used to translate said codes from said sensors to a computer readable file;
   b. a wireless communication means coupled to said translator device and used to communicate with a wireless communication network;
   c. a wireless communication network located in a selected region;
   d. a wide area network; and,
   e. a central computer connected to said wide area network, and used to receive said translated information from said translator device over said wide area network by said wireless communication means.

4. The system as recited in claim 3, wherein said translation means translates said codes into ASCII files.

5. The system as recited in claim 3, further including a physical location detecting means coupled to each said on-board computer, said physical location detecting means used to determine the physical location of said on-board computer.

6. The system, as recited in claim 5, wherein said physical location detecting means is a GPS receiver used in a GPS network.

7. The system, as recited in claim 6, wherein said wireless communication means is a wireless modem used to communicate with said wireless communication network.

8. The system, as recited in claim 3, further including a client-side software program loaded into each said on-board computer and a server side software program loaded into said central server to enable said on-board computer to communicate with said central server.

9. The system as recited in claim 3, further including an on-board computer connected to said translating means and said wireless communication means.

10. A system for transmitting and displaying diagnostic and performance information for a motor vehicle having an on-board diagnostic system, said on-board diagnostic system including a plurality of sensors capable of transmitting codes indicating the status of components on said motor vehicle, said system comprising:
    a. a translating device located in each motor vehicle coupled to said sensors and used to translate said codes from said sensors to computer readable files;
    b. an on-board computer connected to said translating device;
    c. a wireless communication means coupled to said on-board computers for communicating with a wireless communication network located around a region;
    d. a wireless communication network;
    e. a computer wide area network; and,
    f. a central computer connected to said wide area network, said central computer used to receive said computer readable files from a plurality of said on-board computers in a region and connected to said wide area network by said wireless communication means in a region.

11. The system as recited in claim 10, wherein said translation device translates said codes into ASCII files.

12. The system as recited in claim 10, further including a physical location detecting means coupled to each said on-board computer, said physical location detecting means used to determine the physical location of said on-board computer.

13. The system as recited in claim 12, wherein said physical location means is a GPS receiver used in a GPS network.

14. The system, as recited in claim 10, wherein said wireless communication means is a wireless modem used to communicate with said wireless communication network.

15. The system, as recited in claim 10, wherein said wireless communication means used to communicate with said wireless communication network.

* * * * *

UNITED STATES PATENT AND TRADEMARK OFFICE
CERTIFICATE OF CORRECTION

Figure 1:
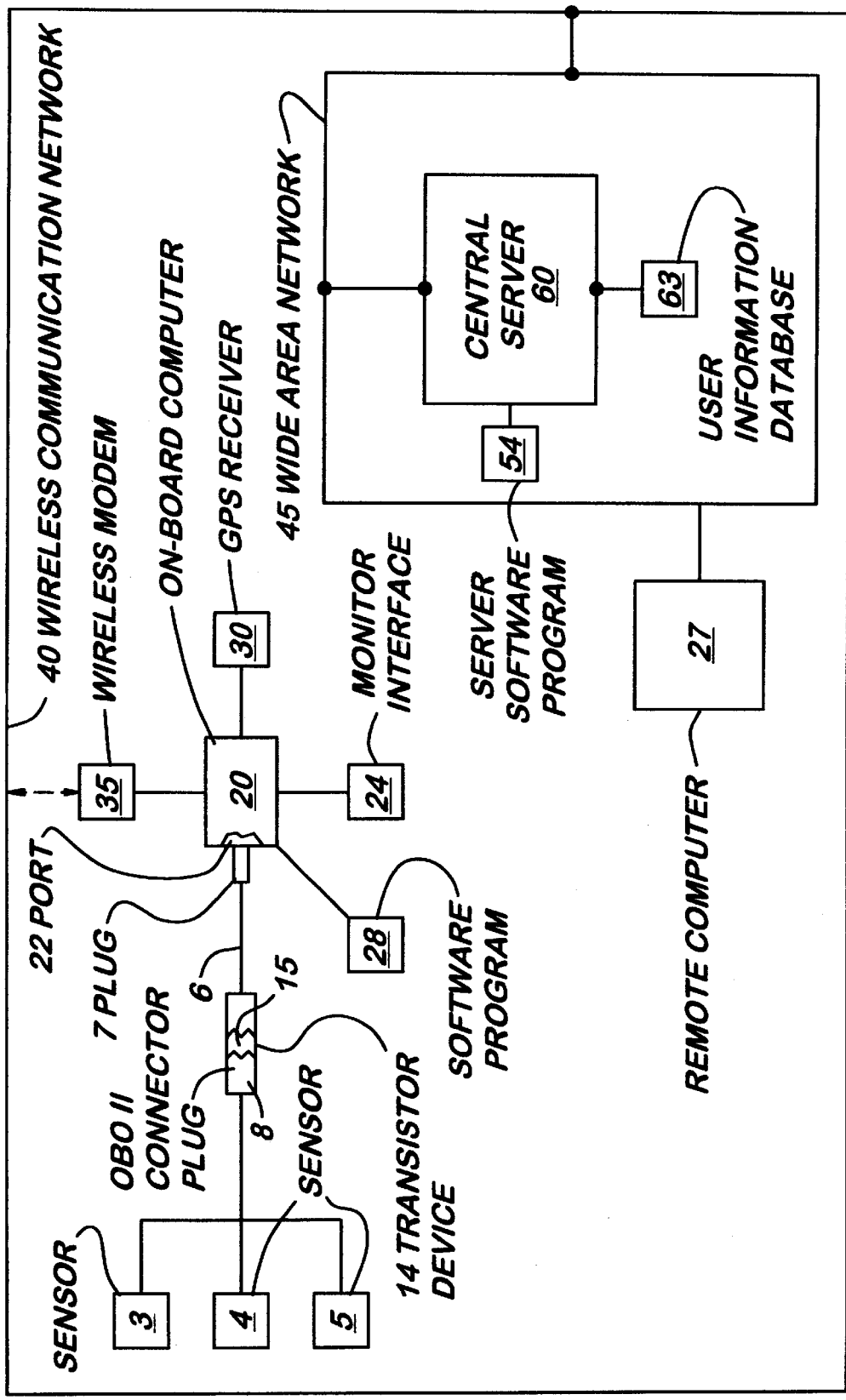
FIG. 1 is a schematic of the system showing the relationship between the different motor vehicle manufacturers, the central server, the wide area network, a plurality of different motor vehicles owned by one operator with a motor vehicle computer coupled to various motor vehicle systems, a translator device, a add-on computer with an display interface, and a remote computer with a display interface.

PATENT NO.    : 6,295,492 B1
DATED         : September 25, 2001
INVENTOR(S)   : Brook W. Lang and Mark H. Tyerman It is certified that error appears in the above-identified patent and that said Letters Patent is hereby corrected as shown below:

<u>Drawings,</u>
Fig. 1, replace "14 TRANSISTOR DEVICE" with -- 14 TRANSLATOR DEVICE --.

<u>Column 5,</u>
Line 43, insert -- device -- after "translator."
Line 57, replace "ttranslation means" with -- translator device --.
Line 60, replace "each said" with -- an --.

<u>Column 6,</u>
Line 10, insert -- an on-board computer and -- after "including."
Line 57, insert -- is -- after "means."

Signed and Sealed this

Eighteenth Day of March, 2003

JAMES E. ROGAN
*Director of the United States Patent and Trademark Office*